US009719549B2

(12) United States Patent
Kondo

(10) Patent No.: US 9,719,549 B2
(45) Date of Patent: Aug. 1, 2017

(54) BOLT

(71) Applicant: IWATA BOLT KABUSHIKI KAISHA, Tokyo-to (JP)

(72) Inventor: Kota Kondo, Nagareyama (JP)

(73) Assignee: IWATA BOLT KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/625,247

(22) Filed: Feb. 18, 2015

(65) Prior Publication Data

US 2016/0091012 A1 Mar. 31, 2016

(30) Foreign Application Priority Data

Sep. 30, 2014 (JP) .............................. 2014-005223 U

(51) Int. Cl.
*F16B 39/30* (2006.01)
(52) U.S. Cl.
CPC .................................. *F16B 39/30* (2013.01)
(58) Field of Classification Search
CPC ............................. F16B 39/30; F16B 25/0052
USPC .................................................. 411/308–311
See application file for complete search history.

(56) References Cited

U.S. PATENT DOCUMENTS

| 2,135,637 | A | * | 11/1938 | Gade | ...................... | F16B 39/30 |
| | | | | | | 411/311 |
| 3,159,842 | A | * | 12/1964 | Neuschotz | ............ | F16B 37/122 |
| | | | | | | 470/14 |
| 3,504,722 | A | * | 4/1970 | Breed | ..................... | B21H 3/025 |
| | | | | | | 411/168 |
| 3,520,344 | A | * | 7/1970 | Gabbey | .................... | B21H 3/00 |
| | | | | | | 411/308 |
| 3,589,157 | A | * | 6/1971 | Tabor | ...................... | F16B 39/30 |
| | | | | | | 72/469 |
| 3,661,194 | A | * | 5/1972 | Macfarlane | ............. | F16B 39/30 |
| | | | | | | 411/311 |
| 3,664,400 | A | * | 5/1972 | Moore | .................... | F16B 39/30 |
| | | | | | | 411/308 |
| 3,850,215 | A | * | 11/1974 | Orlomoski | ............. | B21H 3/025 |
| | | | | | | 411/311 |

(Continued)

FOREIGN PATENT DOCUMENTS

| JP | H08-128420 A | 5/1996 |
| JP | H10-331831 A | 12/1998 |
| JP | 2001-173627 A | 6/2001 |

*Primary Examiner* — Flemming Saether
(74) *Attorney, Agent, or Firm* — Oliff PLC

(57) ABSTRACT

A bolt including a head portion, a shaft portion, and an external thread formed in the shaft portion, the bolt having: a plurality of thread collapsed rib portions each of which is composed of projecting portions that are arranged in a longitudinal direction of the shaft portion, each projecting portion being formed by collapsing a top portion of a screw thread of the external thread and by raising both sides of the collapsed top portion of the screw thread, wherein one projecting portion of the thread collapsed rib portion has a shape different from that of another projecting portion that is adjacent in a circumference direction of the screw thread of the adjacent thread collapsed rib portion in the shaft portion, such that an interference position with a counterpart internal thread varies in accordance with screw-engagement with the counterpart internal thread.

10 Claims, 7 Drawing Sheets

(56) References Cited

U.S. PATENT DOCUMENTS

| | | | | |
|---|---|---|---|---|
| 6,827,538 B2* | 12/2004 | Doppke | ................... | F16B 39/30 411/311 |
| 6,863,483 B2* | 3/2005 | Koenig | ................... | F16B 39/30 411/309 |
| 7,914,244 B2* | 3/2011 | Bubulka | ................. | F16B 33/02 411/307 |
| 8,038,376 B2* | 10/2011 | Jung | ....................... | F16B 39/30 411/308 |

* cited by examiner

BEFORE ROLLED    AFTER ROLLED

BOLT

FIELD OF THE INVENTION

The present invention relates to a bolt, in particular, a bolt capable of preventing rotation loosening.

BACKGROUND ART

Various techniques have been proposed to reduce rotation loosening of a bolt with respect to a nut or the like.

For example, in order to increase a fixation strength and a friction strength on a thread surface, an adhesive agent or a locking agent is applied to the thread surface.

In addition, it is proposed that a projection of a special shape is provided on a threaded part such that the projection interferes with a internal thread so as to increase a friction on a thread surface.

Patent Document 1: JPH8-128420A (JP1996-128420A)
Patent Document 2: JPH10-331831A (JP1998-331831A)
Patent Document 3: JP2001-173627A (JP3871483B)

DISCLOSURE OF THE INVENTION

However, when an adhesive agent or a locking agent is applied to a thread surface of a bolt, the following problems occur. Namely, a secondary fabrication such as application of an adhesive agent or a locking agent is needed, which lowers productivity. In addition, after the bolt has been repeatedly used, reapplication of an adhesive agent or a locking agent becomes necessary.

On the other hand, when a projection of a special shape is provided on a thread surface of a bolt such that the projection interferes with a internal thread so as to increase a friction on a thread surface, the following problems occur. Namely, a screw thread of the internal thread is likely to be significantly damaged, so that the bolt is difficult to be repeatedly used. In addition, a shearing strength is impaired.

Thus, the object of the present invention is to provide a repeatedly usable bolt capable of preventing loosening, which can solve the problems of the prior technique without requiring a complicated secondary fabrication.

In order to solve the above problems, a bolt according to the present invention is a bolt including a head portion, a shaft portion, and an external thread formed in the shaft portion, the bolt having: a plurality of thread collapsed rib portions each of which is composed of projecting portions that are arranged in a longitudinal direction of the shaft portion, each projecting portion being formed by collapsing a top portion of a screw thread of the external thread and by raising both sides of the collapsed top portion of the screw thread, wherein one projecting portion of the thread collapsed rib portion has a shape different from that of another projecting portion which is adjacent in a circumference direction of the screw thread of the adjacent thread collapsed rib portion in the shaft portion, such that an interference position with a counterpart internal thread varies in accordance with screw-engagement with the counterpart internal thread.

In addition, the shape of the projecting portion is defined by a projection position that is a radial position from a shaft center of the shaft portion, and a projection dimension that is a dimension protruding from the screw thread; and the smaller the projection position is, the larger the projection dimension is.

In addition, the projection position has a value between a predetermined maximum value and a predetermined minimum value; the predetermined maximum value is smaller than a minimum value of an outside diameter of the external thread of the bolt in the JIS standard; and the predetermined minimum value is larger than a maximum value of an effective diameter of the counterpart internal thread in the JIS standard.

In addition, the thread collapsed rib portion is formed helically with respect to the shaft center of the shaft portion.

In addition, two types of the thread collapsed rib portions having different projection positions and different projection dimensions are alternately arranged.

In addition, the projection position and the projection dimension gradually increase or decrease from the head portion toward a distal end.

In addition, a bolt including a head portion, a shaft portion, and an external thread formed in the shaft portion, the bolt having: a thread collapsed rib portion composed of projecting portions that are arranged in a longitudinal direction of the shaft portion, each projecting portion being formed by collapsing a top portion of a screw thread of the external thread and by raising both sides of the collapsed top portion of the screw thread; wherein: a shape of the projecting portion is defined by a projection position that is a radial position from a shaft center of the shaft portion, and a projection dimension that is a dimension protruding from the screw thread; the smaller the projection position is, the larger the projection dimension is, and the projecting portion of the thread collapsed rib portion has the projection position and the projection dimension which gradually increase or decrease from the head portion toward a distal end, such that an interference position with a counterpart internal thread varies in accordance with screw-engagement with the counterpart internal thread.

According to the structure of the present invention, a certain projecting portion of the thread collapsed rib portion has a shape different from that of the projecting portion which is adjacent in the circumferential direction of the screw thread of the adjacent thread collapsed rib portion in the shaft portion, such that the interference position with the counterpart internal thread varies in accordance with the screw-engagement with the counterpart internal thread. Thus, a wall part of the counterpart internal thread, which was plastically deformed by the certain projection, can cause a new interference with a subsequent projection portion, whereby loosening with respect to the counterpart internal thread can be prevented.

BEST MODES FOR CARRYING OUT THE INVENTION

Figure 1:
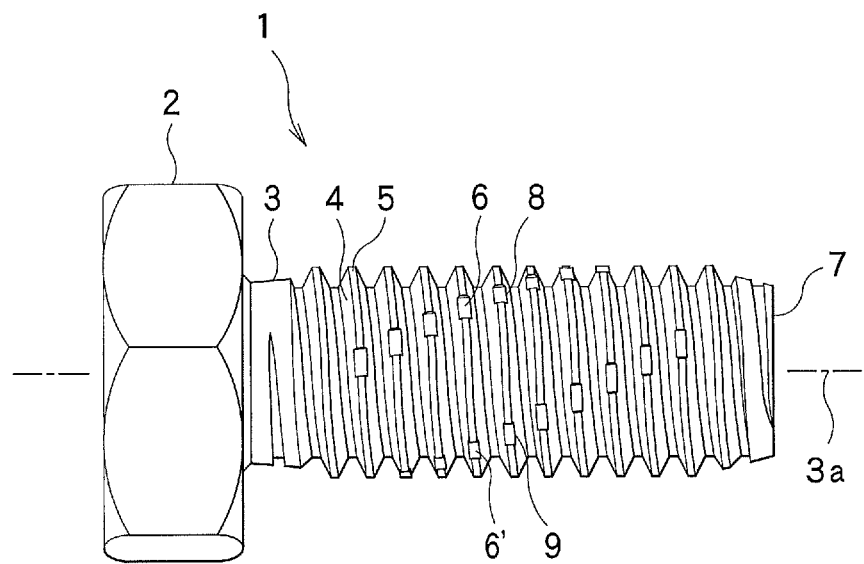
FIG. 1 is a view showing a bolt according to one embodiment of the present invention.
Figure 2:
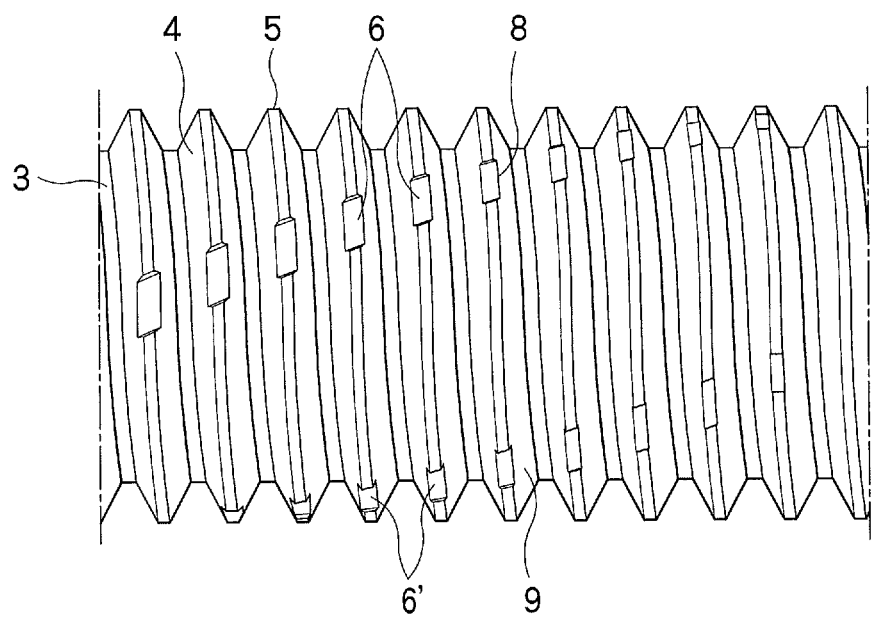
FIG. 2 is a view showing in enlargement a thread collapsed rib portion of FIG. 1.

Embodiments of a bolt according to the present invention will be described herebelow with reference to the drawings. In FIG. 1, a bolt 1 includes a head portion 2, a shaft portion 3, and an external thread 4 formed on the shaft portion 3. The external thread 4 of the shaft portion 3 is provided with projection portions 6 each of which is formed by collapsing a top portion of a screw thread 5 and by raising both sides of the collapsed top portion of the screw thread 5. On the external thread 4 of the shaft portion 3, the projecting portions 6 formed on the respective screw threads 5 constitute a plurality of, e.g., four thread collapsed rib portions 8, 9 that are longitudinally arranged from the head portion 2 toward a distal end portion 7. In this embodiment, the four thread collapsed rib portions 8, 9 are formed helically with respect to a shaft center 3a of the shaft portion 3 with equal spacings therebetween. FIG. 2 is a view showing in enlargement the external thread 4 formed on the shaft portion 3 in FIG. 1. Not limited to the helical shape, the thread collapsed rib portions 8, 9 may be formed in another shape such as in a linear shape.

The thread collapsed rib portions 8, 9 that are adjacent to each other have the same shape in terms of the same helical shape. However, the projecting portion 6 of the thread collapsed rib portion 8 and a projecting portion 6', which is adjacent in a circumferential direction of the screw thread 5 of the adjacent thread collapsed rib portion 9 in the shaft portion 3, have different shapes. Herein, suppose that a circumference of the screw thread 5 starts from a certain projecting portion 6 of the thread collapsed rib portion 9. The projecting portion 6', which is adjacent in the circumferential direction of the screw thread 5 of the adjacent thread collapsed rib portion 9, is a projecting portion of the thread collapsed rib portion 9 which appears next to the certain projecting portion 6. When the external thread 4 is screw-engaged with a not-shown counterpart internal thread, the counterpart internal thread firstly interferes with the projecting portion 6' of the thread collapsed rib portion 9, and then interferes with the projecting portion 6 of the thread collapsed rib portion 8 that is adjacent to the projecting portion 6' in the circumferential direction of the screw thread 5. In this case, as described below, in order that the projecting portion 6 of the thread collapsed rib portion 8 and the projecting portion 6' of the thread collapsed rib portion 9 have different interference positions with the counterpart internal thread upon screw-engagement with the counterpart internal thread, the projecting portion 6 of the thread collapsed rib portion 8 and the projecting portion 6' of the thread collapsed rib portion 9 have shapes different from each other.

Figure 4:
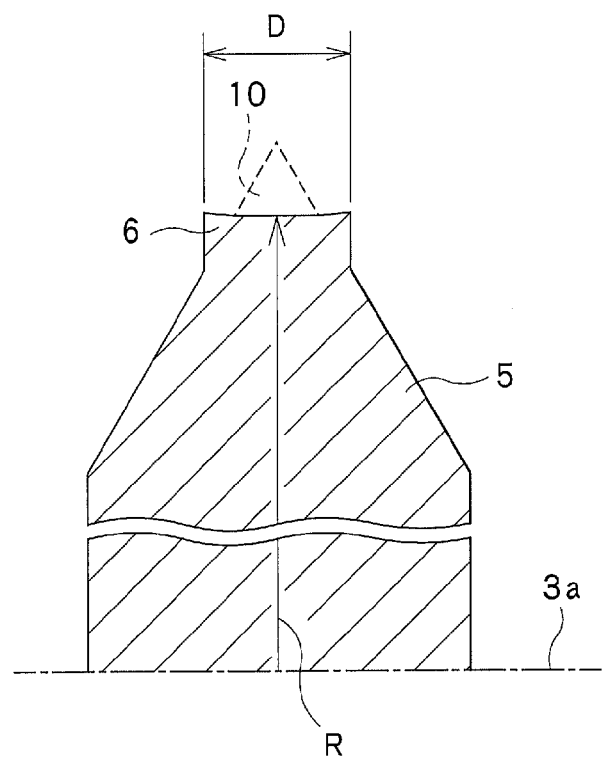
FIG. 4 is a view showing a projection position R of the projecting portion and a projection dimension D thereof.

FIG. 4 is an enlarged sectional view of the projecting portion 6 which is formed by collapsing the top portion of the screw thread 5 and by raising both sides of the collapsed top portion of the screw thread 5. In FIG. 4, the shape of the projecting portion 6 is defined by a projection position R that is a radial position from the shaft center 3a of the shaft portion 3, and a projection dimension D that is a dimension protruding from the screw thread 5. The reference number 10 depicts a collapsed top portion of the screw thread 5. The top portion 10 is moved to both sides of the screw thread 5 so as to form the projecting portion 6. As shown in FIG. 4, the projecting portion 6 is formed by collapsing the top portion 10. As a result, the smaller the projection position R is, the larger the projection dimension D is, while the larger the projection position R is, the smaller the projection dimension D is.

Figure 3A:
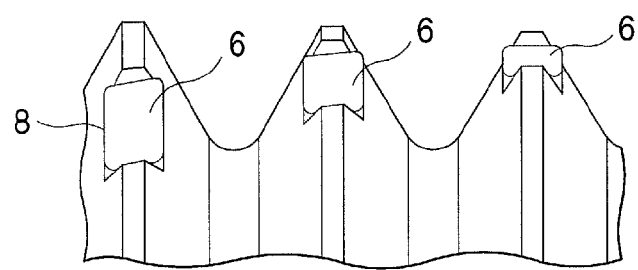
FIGS. 3(a) and 3(b) are a view showing in enlargement a projecting portion of FIG. 2.
Figure 3B:
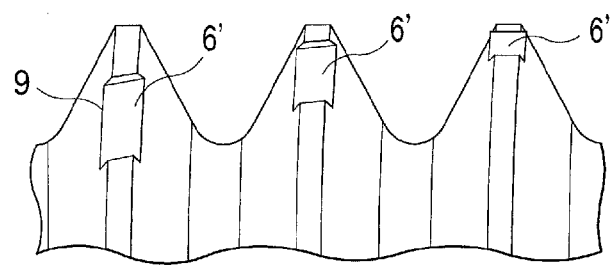

FIG. 3(a) shows in enlargement the thread collapsed rib portion 8 which is formed by arranging helically the projecting portions 6 in the longitudinal direction. FIG. 3(b) shows in enlargement the thread collapsed rib portion 9 which is formed by arranging helically the projecting portions 6' in the longitudinal direction. As compared with the projecting portion 6' of the screw collapsed rib portion 9 shown in FIG. 3(b), the projecting portion 6 of the thread collapsed rib portion 8 shown in FIG. 3(a) has the smaller projection position R and the larger projection dimension D.

Next, a dimension of the projection position R of the projecting portion 6 of the thread collapsed rib portion 8 is explained.

Figure 5:
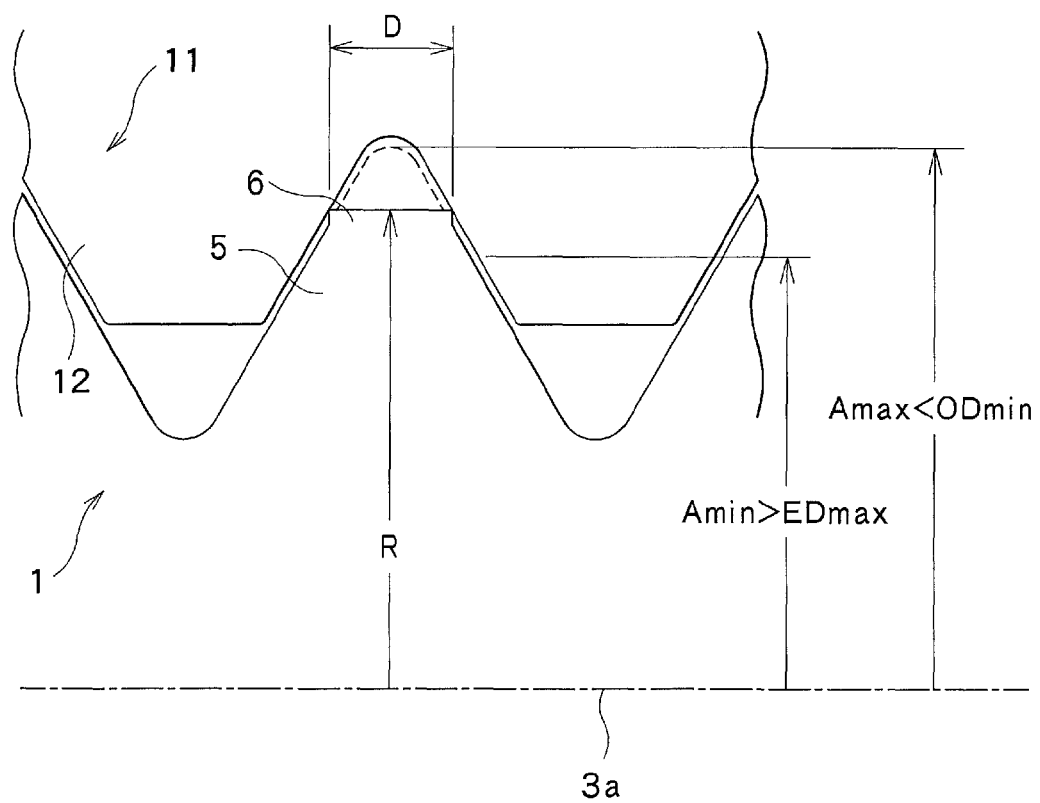
FIG. 5 is a view for explaining a predetermined maximum value Amax of the projection position and a predetermined minimum value Amin thereof.

In FIG. 5, the projection position R has a value between a predetermined maximum value Amax and a predetermined minimum value Amin. The predetermined maximum value Amax is set smaller than a minimum value ODmin of an outside diameter of the external thread of the bolt 1 in the JIS standard. The predetermined minimum value Amin is set larger than a maximum value EDmax of an effective diameter of a counter internal thread 11 in the JIS standard. Herein, the effective diameter is a term defined in the JIS standard, meaning a diameter of an imaginary cylinder in which a thread groove width is equal to a screw thread width.

The reason why the predetermined maximum value Amax is set smaller than the minimum value ODmin of the outside diameter of the external thread of the bolt 1 in the JIS standard is that any bolt that is manufactured within a range allowed by the JIS standard can have the projecting portion 6 that is formed by collapsing the top portion of the screw thread 5 and by raising both sides of the collapsed top portion of the screw thread 5.

In addition, the reason why the predetermined minimum value Amin is set larger than the maximum value EDmax of the effective diameter of the counterpart internal thread 11 in the JIS standard is as follows. Namely, the bolt 1 has to interfere strongly with all the possible counterpart internal threads 11. A counter internal thread 11 is generally manufactured by using a rolling tap or a cutting tap. Although the use of the cutting tap provides a high-quality counterpart internal thread, a manufacturing cost is generally high. On the other hand, the rolling tap is suited for mass production, although the quality is inferior to the counterpart internal thread manufactured by the cutting tap. Thus, even when the counterpart internal thread 11 to be assembled with the bolt 1 is manufactured by using the rolling tap, which may result in a disadvantageous situation, it is necessary that the bolt 1 can strongly interfere with such a counterpart internal thread 11.

On the other hand, when a counterpart internal thread is manufactured by a rolling tap, it sometimes occurs that the top portion of the screw thread cracks to have an incomplete shape. In this case, even when the top portion of the counterpart internal thread cracks to be incompletely molded, the projecting portion 6 of the bolt 1 has to strongly interfere with the counterpart internal thread. Thus, the projecting portion 6 of the bolt 1 needs to strongly interfere with a robust portion of the counterpart internal thread in a reliable manner. In this case, there is a reference for judging that the projecting portion 6 of the bolt 1 can interfere with the robust portion of the counterpart internal thread. Namely, when the projecting portion 6 of the bolt 1 can reach a portion, which is located at a position of a reference dimension of the effective diameter of the counterpart internal thread 11, and can interfere with the portion, it can be judged that the projecting portion 6 of the bolt 1 can interfere with the robust portion of the counterpart internal thread. Based on this theory, the predetermined minimum value Amin is set larger than the maximum value EDmax of the effective diameter of the counterpart internal thread 11 in the JIS standard.

Concrete numerical examples are shown below. Suppose that the external thread 4 of the bolt 1 is a coarse pitch thread of M6 and that a tolerance zone class is 6g. In this case, according to the JIS standard, a tolerance of the outside diameter of the external thread is 5.794 mm to 5.974 mm. The predetermined minimum value ODmin is 5.794 mm, whereby the predetermined maximum value Amax is smaller than 5.794 mm. In addition, in the case of the coarse pitch thread of M6 and a tolerance zone class is 6H, the maximum value EDmax of the counterpart internal thread 11 is 5.500 mm, whereby the predetermined minimum value Amin is larger than 5.500 mm. Herein, the reference dimension of the effective diameter of the counterpart internal thread 11 is 5.350 mm.

Thus, when the external thread 4 is a coarse pitch thread of M6, the projection position R is set smaller than 5.794 mm and set larger than 5.500 mm.

In addition, a collapsed quantity rate B of the external thread 4, i.e., a collapsed rate of the outside diameter of the external thread is examined. Considering that, when the external thread is collapsed to the maximum, the projection position R is 5.500 mm, and that the maximum value within the tolerance of the outside diameter of the external thread is 5.974 mm, a maximum value of the collapsed quantity rate B is 0.079 mm ((5.974 mm−5.500 mm)/5.974 mm). Namely, the collapsed quantity rate B is as small as about 8% of the outside diameter of the external thread, even when it is estimated excessively. In addition, the collapsed quantity is as small as 0.474 mm (5.974 mm−5.500 mm) even when it is estimated excessively.

On the other hand, suppose that the external thread 4 is a coarse pitch thread of M8, and that a tolerance zone class is 6g. In this case, according to the JIS standard, a tolerance of the outside diameter of the external thread is 7.760 mm to 7.972 mm. The minimum value ODmin is 7.760 mm, whereby the predetermined maximum value Amax is smaller than 7.760 mm. In addition, in the case of the coarse pitch thread of M8 and a tolerance zone class is 6H, the maximum value EDmax of the counterpart internal thread 11 is 7.348 mm, whereby the predetermined minimum value Amin is larger than 7.348 mm. Herein, the reference dimension of the effective diameter of the counterpart internal thread 11 is 7.188 mm.

Thus, when the external thread 4 is a coarse pitch thread of M8, the projection position R is set smaller than 7.760 mm and set larger than 7.348 mm.

In addition, as to a collapsed quantity rate B of the external thread 4, considering that, when external thread is collapsed to the maximum, the projection position R is 7.348 mm, and that the maximum value within the tolerance of the outside diameter of the external thread is 7.972 mm, a maximum value of the collapsed quantity rate B is 0.078 mm ((7.972 mm−7.348 mm)/7.972 mm). Namely, the collapsed quantity rate B is as small as about 8% of the outside diameter of the external thread, even when it is estimated excessively. In addition, the collapsed quantity is as small as 0.624 mm (7.972 mm−7.348 mm) even when it is estimated excessively.

Next, an operation of the projecting portion 6 of the bolt 1 is explained with reference to FIGS. 6 to 8.

Figure 6:
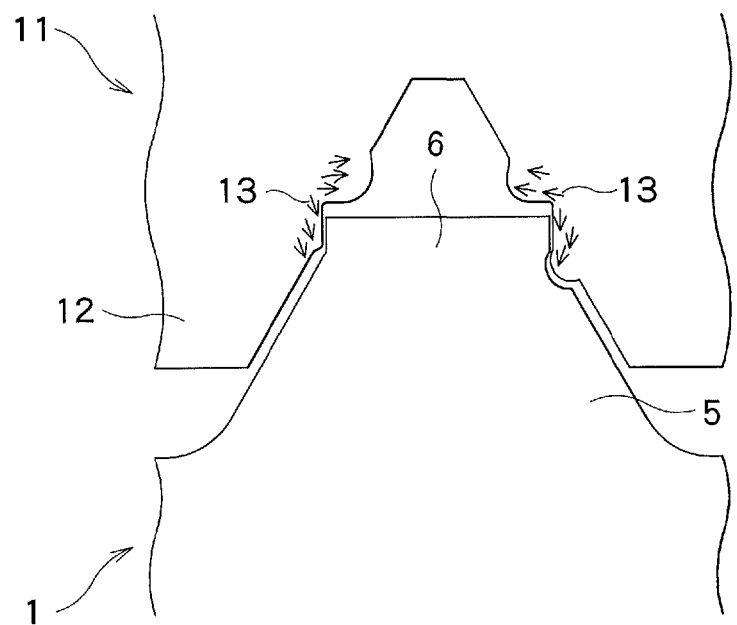
FIG. 6 is a view for explaining an operation of the projecting portion.

FIG. 6 shows a state in which the projecting portion 6 of the thread collapsed rib portion 8 in FIG. 1 interferes with a screw thread 12 of the counterpart external thread 11. The projecting portion 6 interferes with the screw thread 12 of the counterpart internal thread 11 at a position corresponding to the projection position R and the projection dimension D of the projecting portion 6, so that the screw thread 12 of the counterpart internal thread 11 is plastically deformed. Thus, as shown by the arrows 13, a wall part of the screw thread 12 is plastically deformed and moved upside and downside the projecting portion 6. As compared with the screw thread 12 of the counterpart internal thread 11 before the interference with the projecting portion 6, the shape of the screw thread 12 of the counterpart internal thread 11 is deformed after the interference with the projecting portion 6.

Figure 7:
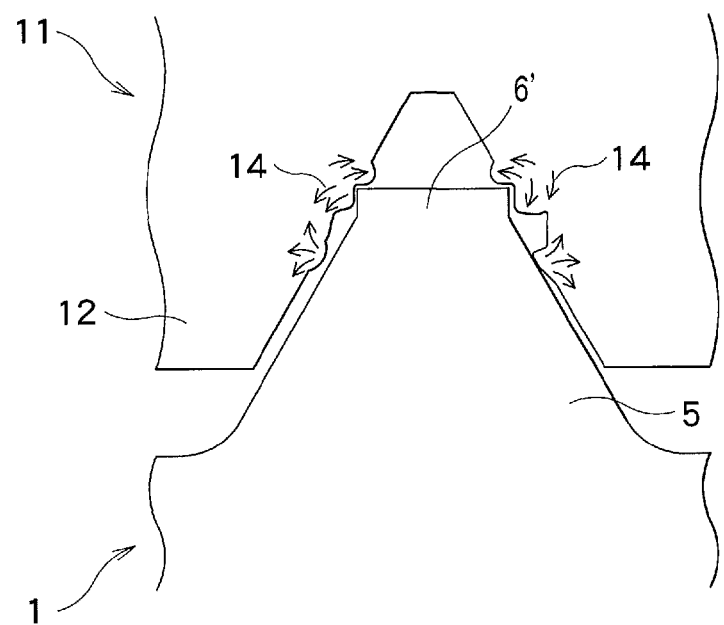
FIG. 7 is a view for explaining the operation of the projecting portion.

Then, as shown in FIG. 7, in accordance with the rotation of the bolt 1, the screw thread 12 of the counterpart internal thread 11 interferes with the projecting portion 6' of the thread collapsed rib portion 9 adjacent to the thread collapsed rib portion 8. As described above, suppose that a circumference of the screw thread 5 starts from the certain projecting portion 6. In this case, the projecting portion 6' is a projecting portion that is firstly met by the certain screw thread 12 of the counterpart internal thread 11 subsequently to the projecting portion 6. Since the projection position R and the projection dimension D of the projecting portion 6' differ from the projection position R and the projection dimension D of the projecting portion 6, it is possible for the projecting portion 6' to again interfere with the screw thread 12 of the counterpart internal thread 11 that was plastically deformed and moved by the projecting portion 6. As a result, the wall part of the screw thread 12 of the counterpart internal thread 11 is moved as shown in by the arrows 14.

Figure 8:
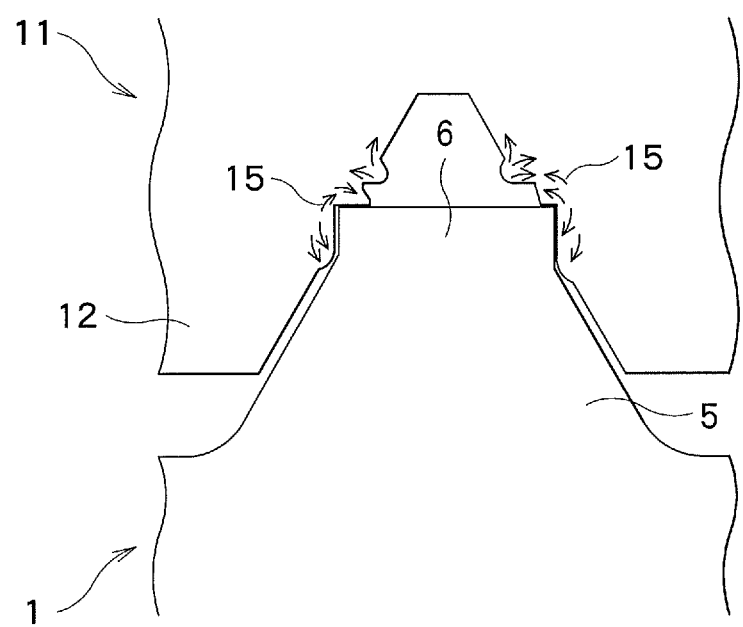
FIG. 8 is a view for explaining the operation of the projecting portion.

FIG. 8 shows that, in accordance with the rotation of the bolt 1, the certain screw thread 12 of the counterpart internal thread 11 further interferes with another projecting portion 6 of the thread collapsed rib portion 8 adjacent to the thread collapsed rib portion 9, whereby the wall part is moved as shown by the arrows 15.

As described above, the projecting portion 6 of the thread collapsed rib portion 8 of the bolt 1 has the projection position R and the projection dimension D that differ from those of the projecting portion 6' which is adjacent in the circumferential direction of the screw thread of the adjacent thread collapsed rib portion 9 in the shaft portion 3, such that the interference position with the counterpart internal thread 11 varies in accordance with the screw-engagement with the counterpart internal thread 11. Thus, in accordance with the rotation of the bolt 1, the bolt 1 can cause a new interference with the counterpart internal thread 11, whereby loosening can be prevented.

In addition, in this embodiment, as shown by the concrete numerical values for M6 and M8, as compared with the conventional various examples, the collapsed quantity rate, which is a rate of the collapsed outside diameter of the external thread, is significantly smaller, i.e., as small as about 8% of the outside diameter of the external thread, even when it is estimated excessively. As can be understood from the small collapsed quantity rate B, the collapsed quantity is 0.474 mm in the case of M6, or 0.624 mm in the case of M8, even when it is estimated excessively. That is to say, the projecting portion 6 is formed significantly smaller than the various conventional examples. Since the projecting portion 6 is formed significantly smaller than the various conventional examples, the projecting portion 6 can solve the conventional problem that a bolt cannot be repeatedly used because it gives serious damage to a screw thread of an internal thread.

On the other hand, although the projecting portion 6 is formed significantly smaller than the various conventional examples, the projecting portion 6 can effectively provide an effect of stopping rotation for the following reason. Namely, a certain projecting portion 6 of the thread collapsed rib portion 8 has a shape different from that of the projecting portion 6' which is adjacent in the circumferential direction of the screw thread of the adjacent thread collapsed rib portion 9 in the shaft portion 3, such that the interference position with the counterpart internal thread 11 varies in accordance with the screw-engagement with the counterpart internal thread 11. Thus, due to the cooperation of the plurality of projecting portions 6 and the projecting portions 6', the wall part of the screw thread 12 of the counterpart internal thread 11 is moved to constantly create a new interference operation, whereby no loosening occurs.

Next, another embodiment of the present invention is described with reference to FIG. 9.

Figure 9:
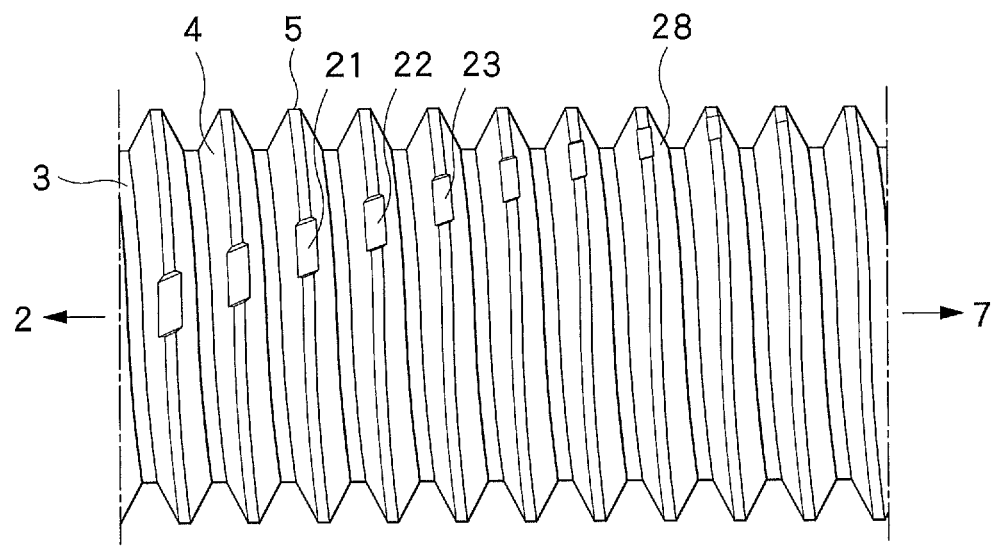
FIG. 9 is a view showing a bolt according to another embodiment of the present invention.

In FIG. 9, one line of thread collapsed rib portion 28 is helically formed on the external thread 4 of the shaft portion 3. The thread collapsed rib portion 28 is composed of projecting portions 21, 22, 23 . . . that are arranged from the head portion 2 toward the distal end portion 7. Each of projecting portions 21, 22, 23 . . . has the projection position R that increases from the head portion 2 toward the distal end portion 7, and has the projection dimension D that decreases from the head portion 2 toward the distal end portion 7.

According to this embodiment, the one line of thread collapsed rib portion 28 has the projecting portions 21, 22, 23 . . . each of which having the projection position R that increases from the head portion 2 toward the distal end portion 7, and has the projection dimension D that decreases from the head portion 2 toward the distal end portion 7. Thus, since the interference position with the counterpart internal thread 11 varies in accordance with the screw-engagement with the counterpart internal thread 11, the bolt 1 can cause a new interference with the counterpart internal thread 11 in accordance with the rotation of the bolt 1, whereby loosening can be prevented.

Although FIG. 9 shows the example in which the projecting portions 21, 22, 23 each of which has the projection position R that increases from the head portion 2 toward the distal end portion 7, and has the projection dimension D that decreases from the head portion 2 toward the distal end portion 7, the projecting portions 21, 22, 23 . . . each of which may reversely has the projection position R that decreases from the head portion 2 toward the distal end portion 7, and has the projection dimension D that increases from the head portion 2 toward the distal end portion 7.

Next, a modification example of the embodiment shown in FIG. 9 is described with reference to FIG. 10. FIG. 9 shows the example in which only the one line of the thread collapsed rib portion 28 is formed. However, in FIG. 10, a plurality of (e.g., four) thread collapsed rib portions 28, 29 are helically formed. The thread collapsed rib portion 28 is composed of projecting portions 21, 22, 23 . . . that are arranged from the head portion 2 toward the distal end portion 7. Each of projecting portions 21, 22, 23 . . . has the projection position R that increases from the head portion 2 toward the distal end portion 7, and has the projection dimension D that decreases from the head portion 2 toward the distal end portion 7. On the other hand, the thread collapsed rib portion 29 is composed of projecting portions 21', 22', 23' . . . each of which having the projection position R that decreases from the head portion 2 toward the distal end portion 7, and having the projection dimension D that increases from the head portion 2 toward the distal end portion 7. Thus, the bolt 1 can frequently cause a new interference with the counterpart internal thread 11 in accordance with the rotation of the bolt 1, whereby loosening can be prevented. In addition, as compared with the case in which the one thread collapsed rib portion 28 is provided as shown in FIG. 9, since the plurality of thread collapsed rib portions 28 and 29 are formed, mutual interference with the counterpart internal thread 11 can be frequently caused during one rotation of the bolt 1, whereby the effect of stopping rotation can be more reliably achieved.

Figure 10:
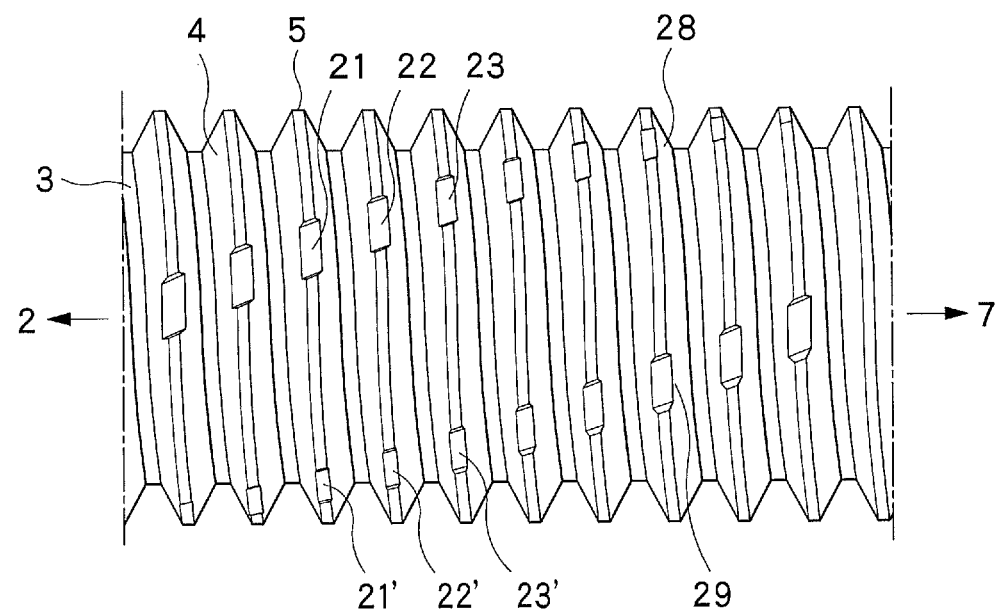
FIG. 10 is a view showing a bolt according to yet another embodiment of the present invention.

Although FIG. 10 shows the example in which the projection position R and the projection dimension D of the thread collapsed rib portions 28 and 29 gradually increases and decreases from the head portion 2 toward the distal end portion 7, the projection position R and the projection dimension D of the thread collapsed rib portion 28 gradually increases or decreases from the head portion 2 toward the distal end portion 7, while the projection position R and the projection dimension D of the thread collapsed rib portion 29 may be unchanged. Also in this case, the bolt 1 can frequently cause a new interference with the counterpart internal thread 11 in accordance with the rotation of the bolt 1, whereby loosening can be prevented.

Next, formation of the projecting portion 6 by collapsing the top portion of the screw thread 5 and raising both sides of the collapsed top portion of the screw thread 5 is described.

Figure 11:
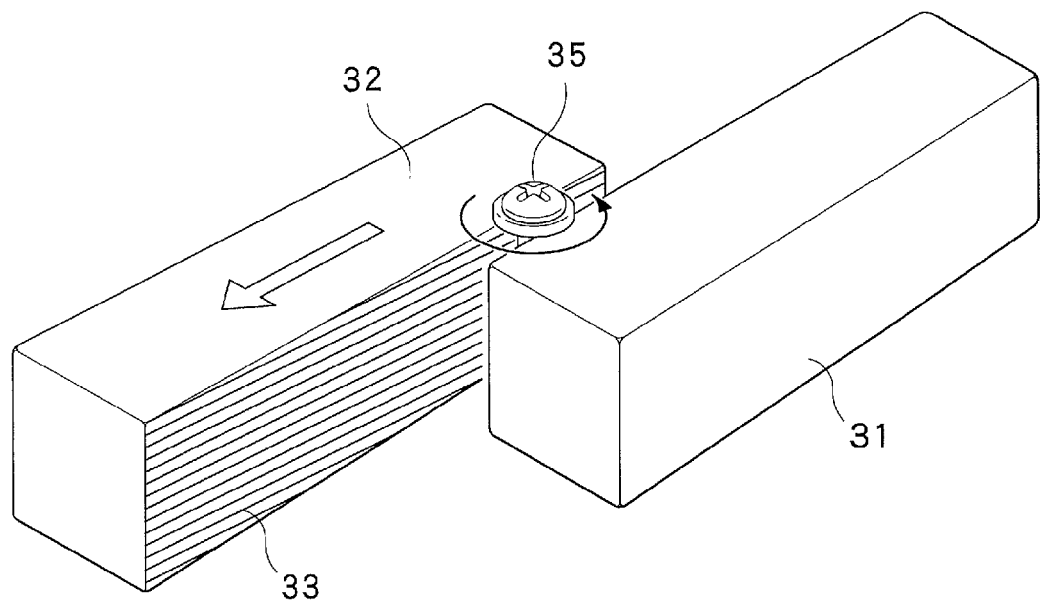
FIG. 11 is a view showing a part of a manufacturing apparatus for manufacturing a bolt.
Figure 12:
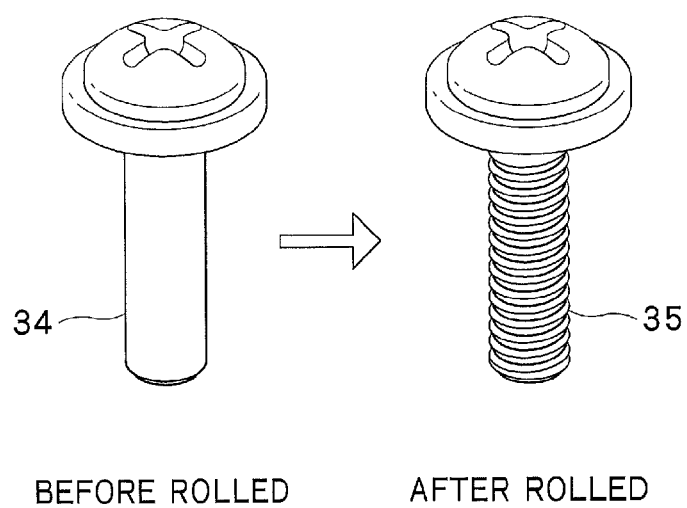
FIG. 12 is a view showing a bolt, which is not yet rolled, and a bolt, which has been already rolled.

FIG. 11 shows a manufacturing apparatus for manufacturing a bolt 35 by rolling a blank with the use of a fixed-side dice 31 and a movable-side dice 32. Opposed surfaces of the fixed-side dice 31 and the movable-side dice 32 have diagonally inclined projecting grooves 33. FIG. 12 shows a material 34 that is not yet rolled, and a rolled bolt 35 in which a screw thread is formed by moving the movable-side dice 32 with respect to the fixed-side dice 31.

Formation of the projecting portion 6 is performed by assembling a groove machining chip having inclined grooves inclined in an up and down direction in both or one of the fixed-side dice 31 and the movable-side dice 32. The shape of the projecting portion 6 can be changed by replacing the groove machining chip with another one.

1 Bolt
2 Head portion
3 Shaft portion
3a Shaft center
4 External thread
5 Screw thread
6 Projecting portion
6' Projecting portion
8, 9 Thread collapsed rib portion
11 Counterpart internal thread
R Projection position
D Projection dimension
Amin Predetermined minimum value
Amax Predetermined maximum value
EDmax Maximum value of effective diameter
ODmin Minimum value of outside diameter

What is claimed is:

1. A bolt including a head portion, a shaft portion, and an external thread formed in the shaft portion, the bolt comprising:
   a plurality of thread collapsed rib portions each of which is composed of projecting portions that are arranged in a longitudinal direction of the shaft portion, each projecting portion being formed by collapsing a top portion of a screw thread of the external thread and by raising both sides of the collapsed top portion of the screw thread, wherein:
   one projecting portion of the thread collapsed rib portion has a shape different from that of another projecting portion which is adjacent in a circumference direction of the screw thread of the adjacent thread collapsed rib portion in the shaft portion, such that an interference position with a counterpart internal thread varies in accordance with screw-engagement with the counterpart internal thread,
   the bolt is a non-tapping bolt,
   an area is formed on the thread between each projecting portion and a bottom portion of the external thread, and
   the projecting portion projects outwardly from the area formed on the thread between the projecting portion and the bottom portion of the external thread.

2. The bolt according to claim 1, wherein:
   the shape of each of the projecting portions is defined by a projection position that is a radial position from a shaft center of the shaft portion, and a projection dimension that is a dimension protruding from the screw thread; and
   as the projection position is smaller, the projection dimension is larger.

3. The bolt according to claim 2, wherein:
   the projection position has a value between a predetermined maximum value and a predetermined minimum value;
   the predetermined maximum value is smaller than a minimum value of an outside diameter of the external thread of the bolt in the JIS standard; and
   the predetermined minimum value is larger than a maximum value of an effective diameter of the counterpart internal thread in the JIS standard.

4. The bolt according to claim 2, wherein
   the thread collapsed rib portion is formed helically with respect to the shaft center of the shaft portion.

5. The bolt according to claim 4, wherein
   two types of the thread collapsed rib portions having different projection positions and different projection dimensions are alternately arranged.

6. The bolt according to claim 4, wherein
   the projection position and the projection dimension gradually increase or decrease from the head portion toward a distal end.

7. The bolt according to claim 3, wherein
   the thread collapsed rib portion is formed helically with respect to the shaft center of the shaft portion.

8. The bolt according to claim 7, wherein
   two types of the thread collapsed rib portions having different projection positions and different projection dimensions are alternately arranged.

9. The bolt according to claim 7, wherein
   the projection position and the projection dimension gradually increase or decrease from the head portion toward a distal end.

10. A bolt including a head portion, a shaft portion, and an external thread formed in the shaft portion, the bolt comprising:
    a thread collapsed rib portion composed of projecting portions that are arranged in a longitudinal direction of the shaft portion, each projecting portion being formed by collapsing a top portion of a screw thread of the external thread and by raising both sides of the collapsed top portion of the screw thread;
    wherein:
    a shape of each of the projecting portions is defined by a projection position that is a radial position from a shaft center of the shaft portion, and a projection dimension that is a dimension protruding from the screw thread;
    as the projection position is smaller, the projection dimension is larger,
    the projecting portion of the thread collapsed rib portion has the projection position and the projection dimension which gradually increase or decrease from the head portion toward a distal end, such that an interference position with a counterpart internal thread varies in accordance with screw-engagement with the counterpart internal thread,
    the bolt is a non-tapping bolt,
    an area is formed on the thread between each projecting portion and a bottom portion of the external thread, and
    the projecting portion projects outwardly from the area formed on the thread between the projecting portion and the bottom portion of the external thread.

* * * * *